United States Patent [19]

Morris et al.

[11] Patent Number: 4,479,059

[45] Date of Patent: Oct. 23, 1984

[54] IMAGING RADIATION DETECTOR WITH GAIN

[75] Inventors: Christopher L. Morris; George C. Idzorek, both of Los Alamos; Leroy G. Atencio, Espanola, all of N. Mex.

[73] Assignee: The United States of America as represented by the United States Department of Energy, Washington, D.C.

[21] Appl. No.: 400,545

[22] Filed: Jul. 21, 1982

[51] Int. Cl.$^3$ .................... G01T 1/18

[52] U.S. Cl. .................... 250/385

[58] Field of Search .................... 250/374, 385

[56] References Cited

U.S. PATENT DOCUMENTS 3,772,521 11/1973 Perez-Mendez .................... 250/385
4,320,299 3/1982 Bateman et al. .................... 250/385
4,392,057 7/1983 Mathieson et al. .................... 250/385

OTHER PUBLICATIONS

Borkowski et al, "New Type of Position-Sensitive Detectors of Ionizing Radiation Using Rise-Time Measurement," *Rev. Sci. Instrum.* 39, No. 10, pp. 1515–1522, (Oct. 1968).

Mathieson, "Linearity and Noise Considerations for Position Sensitive Detectors," *Nuc. Instrum. and Meth.* 97, pp. 171–176, (1971).

*Primary Examiner*—Janice A. Howell
*Attorney, Agent, or Firm*—Leonard C. Brenner; Paul D. Gaetjens; Michael F. Esposito

[57] ABSTRACT

A radiation imaging device which has application in x-ray imaging. The device can be utilized in CAT scanners and other devices which require high sensitivity and low x-ray fluxes. The device utilizes cumulative multiplication of charge carriers on the anode plane and the collection of positive ion charges to image the radiation intensity on the cathode plane. Parallel and orthogonal cathode wire arrays are disclosed as well as a two-dimensional grid pattern for collecting the positive ions on the cathode.

6 Claims, 9 Drawing Figures

"Y" CATHODE

"X" CATHODE

ANODE

IMAGING RADIATION DETECTOR WITH GAINgi

This invention is the result of a contract with the Department of Energy (Contract No. W-7405-ENG-36).

BACKGROUND OF THE INVENTION

The present invention pertains generally to integrating radiation detectors and more particularly to high resolution imaging detectors.

Generally, two types of imaging radiation detectors have been used in the past. The first of these, the gridded ionization chamber, is capable of generating two-dimensional information but is incapable of providing gain. In essence, the gridded ionization chamber operates by providing a cathode plane and a two-dimensional anode array. Normally, the anode array is held at near ground potential to increase signal to noise ratio. Since the cathode is held at some negative dc potential, substantially straight field lines are produced between the cathode plane and anode array. When radiation impinges upon a detector gas disposed between the cathode and anode, charge carriers are generated which drift along the substantially straight lines. Negative charge from electrons are accumulated on the anode array to provide an intensity image of the radiation. Since electric charge carriers are only generated by the interaction of the radiation with the detector gas, gridded ionization chambers are normally only useful with high intensity radiation which is capable of producing a large number of charge carriers.

To overcome these problems the integrating multiwire proportional chamber utilizes a cathode plane which is held at a predetermined negative potential. The anode plane constitutes a series of parallel wires which are held at a predetermined positive potential. By increasing the potential drop between the cathode and anode, charge carriers which are produced by the interaction of the radiation with the detector gas, are accelerated by the electric field potential between the cathode and anode. The acceleration of electrons towards the anode wire causes these electrons to collide with, and ionize, detector gas molecules, thereby releasing new electrons, which, in turn have more collisions, so as to produce cumulative ionization and thereby increase the number of charged particles, i.e., electrons collected on the anode wire plane. This gain in detector response can increase the number of charged particles collected by a factor of $10^5$. Consequently, much better signal to noise ratios can be achieved with multiwire proportional chambers and much lower intensity radiation can be imaged.

However, several problems exist with the integrating multiwire proportional chamber. It has been found that the minimum practical anode wire separation is approximately 2 mm which consequently limits the position resolution of the multiwire proportional chamber. Secondly, multiwire proportional chambers are limited to one-dimensional position imaging since the current produced by the collection of electrons on the anode multiwire plane is integrated and amplified separately for each anode wire. Although orthogonal anode wire planes can be disposed on two sides of the cathode plane, only one-dimensional information in two directions can be achieved in the multiwire proportional chamber. Moreover, use of a two-dimensional pattern on a single plane, such as a checkerboard pattern, will not cause avalanching of charged carriers since only wire planes using wires of a specified diameter are capable of producing the avalanche effect, i.e., the cumulative multiplication of charged carriers.

Consequently, it is desirable to produce an imaging radiation detector which provides true two-dimensional information and utilizes the avalanching effect to provide gain in the system to allow the system to image low intensity radiation with increased signal to noise ratio.

SUMMARY OF THE INVENTION

It is therefore an object of the present invention to provide an improved integrating imaging radiation detector.

It is also an object of the present invention to provide an imaging radiation detector with gain.

Another object of the present invention is to provide a two-dimensional radiation detector.

Another object of the present invention is to provide a two-dimensional radiation detector having high resolution and gain.

Another object of the present invention is to provide a two-dimensional X-ray detector with enhanced resolution and gain.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a two-dimensional integrating radiation detector having high resolution and gain comprising: a detector gas; charge carriers generated by the interaction of said radiation with said detector gas; anode means biased at a predetermined positive potential sufficient to cause cumulative multiplication of said charge carriers for enhancing detector gain; two-dimensional cathode means for accumulating a positive charge from positive ions generated by said cumulative multiplication of charge carriers; means for sampling said positive charge accumulated on said two-dimensional cathode means to obtain a two-dimensional intensity distribution of said radiation; whereby enhanced detector resolution is obtained by accumulating a positive charge from positive ions.

The present invention may also comprise, in accordance with its objects and purposes, a two-dimensional X-ray detector with enhanced resolution and gain comprising: a source of X-rays; a detector gas; anode means biased at a predetermined positive potential to attract electrons generated by the interaction of said X-rays with said detector gas and to cause avalanching of charged particles; first cathode means biased at near ground potential to attract positive ions generated by said avalanching of charged particles and by the interaction of said X-rays with said detector gas, said first cathode means for detecting positive ions in an X direction; second cathode means biased at near ground potential to attract positive ions generated by said avalanching of charged particles and by the interaction of said X-rays with said detector gas, said second cathode means for detecting positive ions in a Y direction; electronic means for measuring the magnitude of positive charge collected on said first and second cathode means for a predetermined period; whereby high resolution is obtained by the collection of positive ions.

The advantages of the present invention are that low intensity sources of radiation can be imaged with high resolution thereby greatly increasing the utility of the present device. The higher sensitivity and consequent lower X-ray fluxes needed for use of the present device leads to many possible applications in both industrial and medical X-ray imaging. For example, the present imaging detector can be used in detectors such as CAT scanners, imaging devices for airport baggage inspection systems, focal plane detectors for X-ray diffractometers and detectors for automated electrophoresis experiments.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE PREFERRED EMBODIMENT(s)

Figure 1:
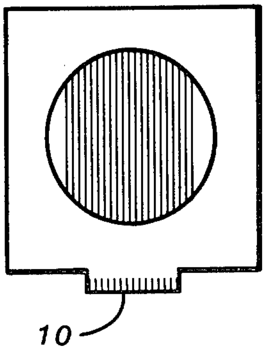
FIG. 1 is a schematic illustration of the Y cathode.
Figure 2:
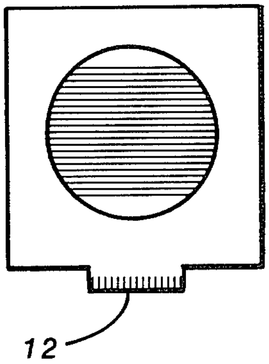
FIG. 2 is a schematic illustration of the X cathode.
Figure 3:
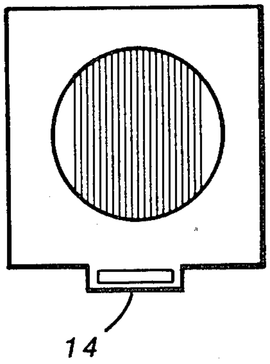
FIG. 3 is a schematic illustration of the anode.
Figure 4:
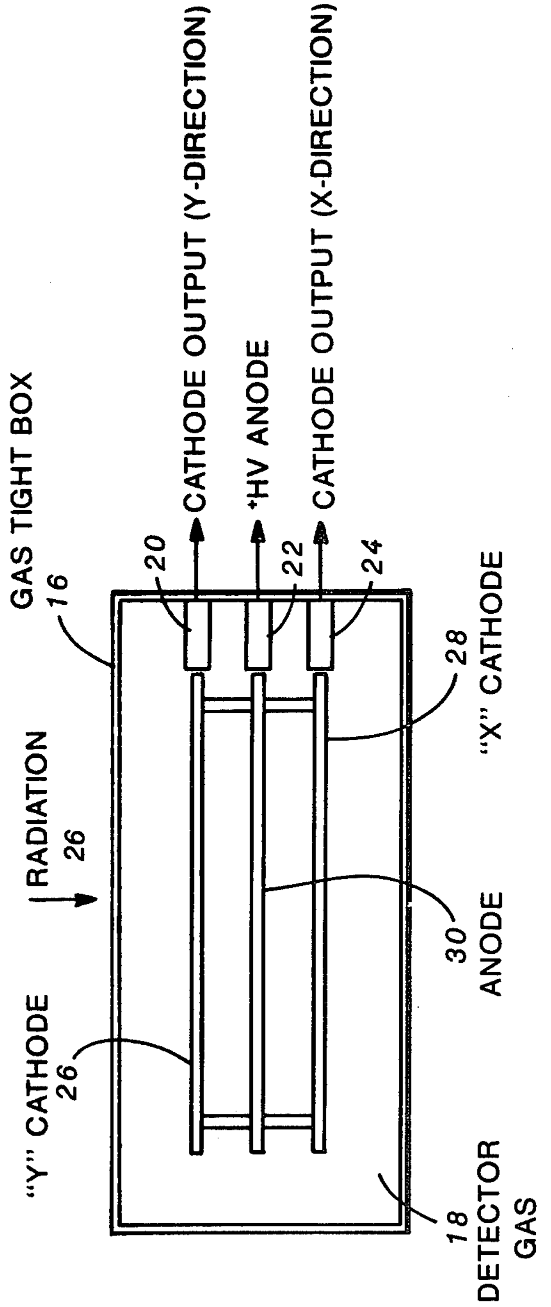
FIG. 4 is a schematic side view of the assembly of the Y cathode, X cathode, and anode illustrated in FIGS. 1 through 3, respectively.

One embodiment of the present invention utilizes three wire planes, two cathode planes illustrated in FIGS. 1 and 2 and an anode plane illustrated in FIG. 3. As schematically illustrated in FIGS. 1 through 3, all of the wire planes are constructed on G-10 frames. The cathode wires are 0.003-in. diameter gold plated copper clad aluminum and are spaced by approximately by 1 mm. The anode wires illustrated in FIG. 3 are 0.0008-in. gold plated tungsten with a 2 mm spacing. Connectors 10 through 14 provide output connections using a conventional connector socket and ribbon cable. Each of the wire planes illustrated in FIGS. 1 through 3 is separated by approximately 0.5-in. and mounted in a gas-tight box 16 containing a detector gas 18, as illustrated in FIG. 4. Connector sockets 20 through 24 position the cathodes and anode such that the radiation beam 26 impinges the plane of these arrays at a nearly normal angle.

In operation, the anode wires are held at a positive high voltage as illustrated in FIG. 4. Charged carriers are produced in the gas volume by interaction of radiation 26 and detector gas 18. Electrons produced by this interaction drift to the anode wire where an avalanche effect takes place. As the electron accelerates towards the anode wire by the strong electric field, [illegible] take place with detector gas molecules causing these molecules to ionize, thereby releasing new electrons. which in turn, have more collisions with other gas molecules, so as to produce cumulative ionization and a large increase in the number of charge carriers collected by the anode. This effect can increase the number of charge carriers by a factor of $10^5$, depending upon the potential drop between the anode and cathode planes. The resultant positively charged ions drift to the cathode plane along nearly straight electric field lines which exist between the cathode and anode. These positively charged ions are collected by the Y cathode 26 and X cathode 28. Since the positive ions drift along the electric field lines, collection of charge on Y cathode 26 and X cathode 28 is well localized. This is due, inpart, to the minimal thermal diffusion of positive ions due to the inertial effects of the ion resulting from its substantial mass when compared of electrons.

Figure 5:
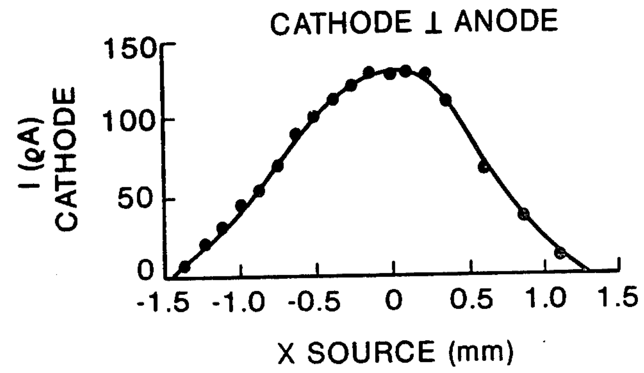
FIG. 5 is a graph of experimental results measured on the X cathode illustrated in FIG. 2.
Figure 6:
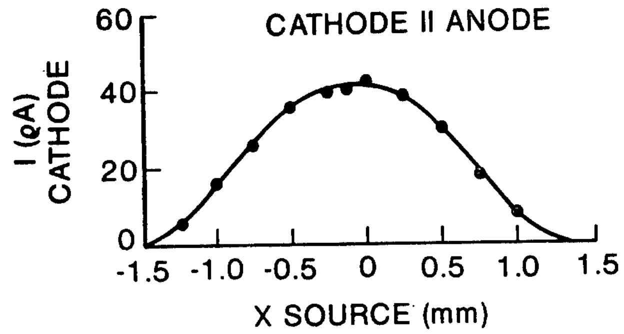
FIG. 6 is a graph of experimental results measured on the Y cathode illustrated in FIG. 1.

FIGS. 5 and 6 illustrate the well localized charge in the X and Y direction, respectively. FIGS. 5 and 6 show the amount of current detected on a single cathode wire of the arrays illustrated in FIGS. 2 and 1, respectively, as a collimated X-ray source is scanned perpendicular to these wires.

Figure 7:
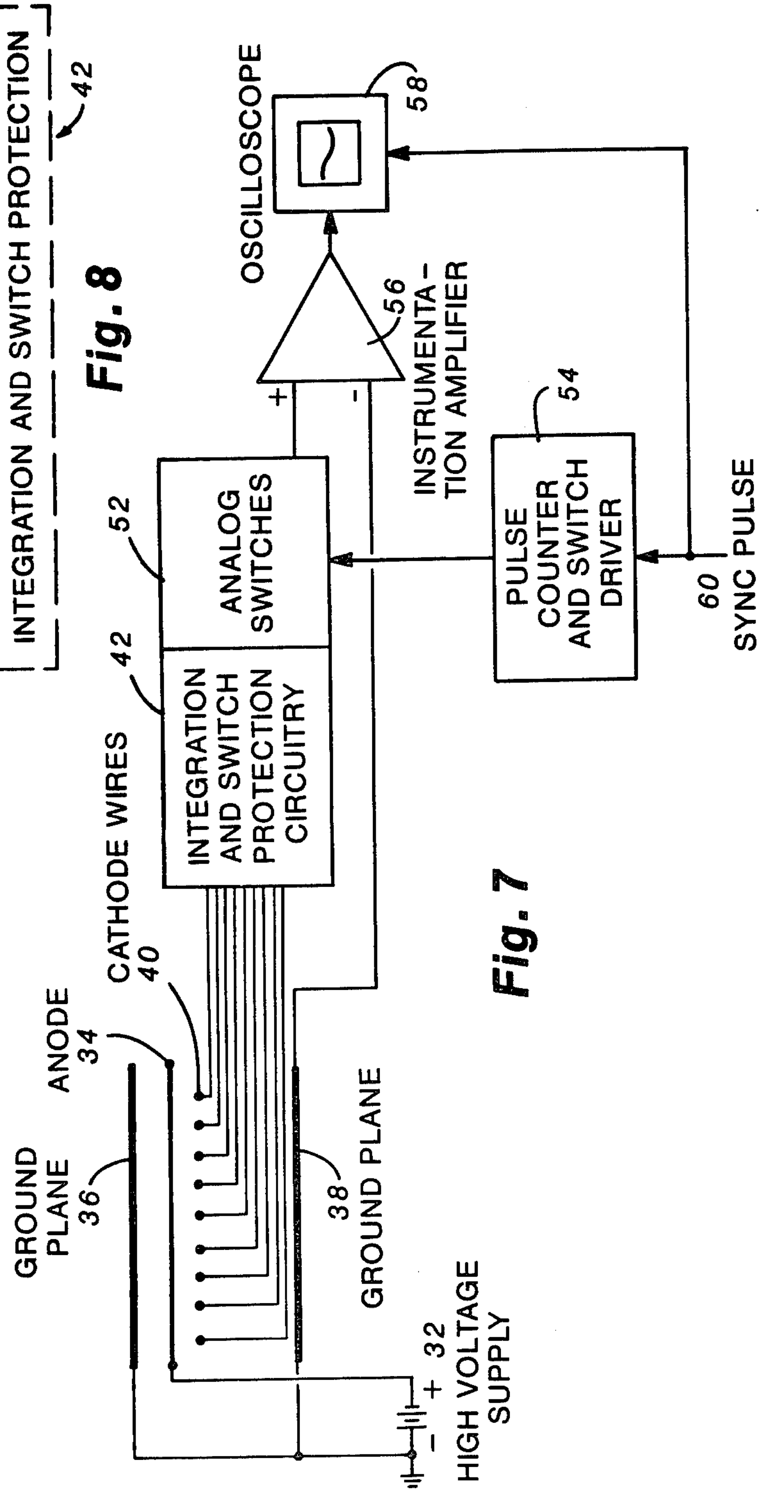
FIG. 7 is a schematic block diagram of an embodiment of the present invention.

FIG. 7 is a schematic block diagram of the detector and associated electronic circuitry of the device of the present invention. As illustrated in FIG. 7, a high voltage supply 32 provides a positive voltage to anode array 34. Ground planes 36 and 38 provide isolation of the detector chamber. Cathode wires 40 detect the positive ions generated in response to the avalanching effect which takes place at anode 34. Cathode wires 40 are coupled to integration and switch protection circuitry 42 which is shown in greater detail in FIG. 8.

Figure 8:
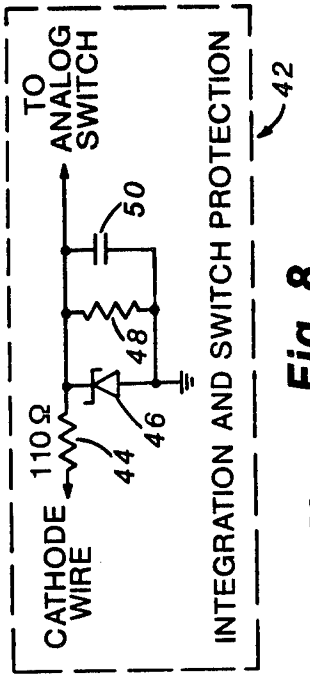
FIG. 8 is a schematic block diagram of the integration and switch protection circuitry schematically illustrated in FIG. 7.

FIG. 8 illustrates the integration and switch protection circuitry 42. A current limiting resistor 44 is provided to protect against high currents which may occur due to sparking across the detector chamber. Additionally, zener diode 46 protects analog switches 52 such that the voltage collected on capacitor 50 does not exceed a predetermined limit, such as 6 volts. The rc time constant of resistor 48 and capacitor 50 are designed such that the accumulated charge is bled-off between analog switching intervals. The pulse counter and switch driver 54 samples each of the anode wires during each switching interval. The sampled pulses are feed to instrumentation amplifier 56 which amplifies the sample voltages and couples these signals at the proper impedance to oscilloscope 58. The switching interval is determined by synchronization pulse 60, which can be provided by a separate radiation detector or a radiation source.

Figure 9:
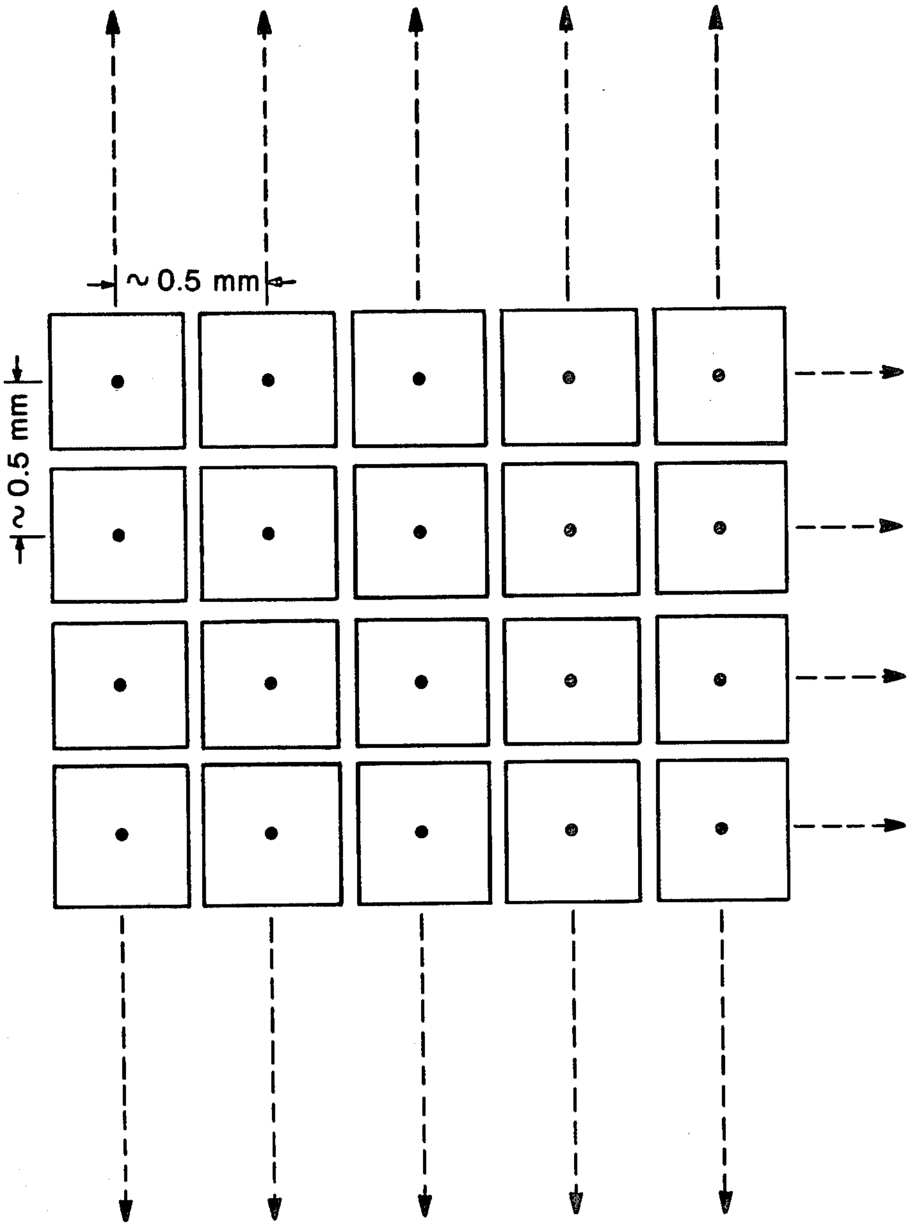
FIG. 9 is a schematic diagram of a patch grid cathode array for use in the present invention for obtaining two-dimensional information.

FIG. 9 illustrates an alternative two-dimensional cathode array. The cathode array illustrated in FIG. 9 uses a "checkerboard" pattern with a minimum spacing of approximately 0.5 mm. The advantage of the cathode array illustrated in FIG. 9 is that true two-dimensional information can be detected by this checkerboard pattern. Spacing between each of the detector squares can be the minimal allowable to prevent conduction. Minimal spacing results from the fact that avalanching occurs on the anode plane only while the cathode plane merely detects positive ions in response to the avalanching effect on the anode. While large field forces are required to produce the avalanching effect on the anode, which tends to drive the anode wires out of a singular plane, the cathode grid needs only to be biased sufficiently to attract the positive ions so that the repelling forces are minimal and spacing between cathode detectors can be minimized. This greatly enhances resolution and signal to noise ratio due to minimal deflection of the ions and a large collection area.

Consequently, the present invention provides an X-ray detector with enhanced resolution and gain which is capable of detecting low intensity radiation sources by the collection of positive ions on the cathode. Moreover, unlike the multiwire proportional chamber, true two-dimensional information can be obtained using the device of the present invention. Consequently, the present invention may have significant utility in various devices for X-ray imaging. The higher sensitivity, and consequent lower X-ray fluxes needed in the present invention lead to many possible applications in both industrial and medical X-ray imaging. For example, the detector of the present invention can be utilized in CAT scanners, imaging devices for airport baggage inspection systems, focal plane detectors for X-ray diffractometers and detectors for automated electrophoresis experiments.

The foregoing description of the preferred embodiment(s) of the invention have been presented for purposes of illustration and description. It is not intended to be exhaustive or to limit the invention to the precise form disclosed, and obviously many modifications and variations are possible in light of the above teaching. The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. A two-dimensional integrating radiation detector for having high resolution and gain comprising:
- a detector gas;
- charge carriers generated by the interaction of said radiation with said detector gas;
- anode means biased at a predetermined positive potential sufficient to cause cumulative multiplication of said charge carriers for enhancing detector gain, said anode means having a plurality of parallel wires equally spaced apart at a close fixed distance;
- two-dimensional cathode means for accumulating a positive charge from positive ions generated by said cumulative multiplication of charge carriers, said two-dimensional cathode means having a first and a second plurality of parallel wires that are equally spaced apart at one-half the distance of said close fixed distance of said plurality of wires of said anode means, said first and said second plurality of parallel wires of said cathode means being orthogonally disposed; and
- means for sampling said positive charge accumulated on said two-dimensional cathode means to obtain a two-dimensional intensity distribution of said radiation.

2. The apparatus of claim 1 wherein said plurality of parallel wires of said anode means are equally spaced apart at a close fixed distance of substantially 2 millimeters.

3. The apparatus of claim 2 wherein each wire in said plurality of parallel wires of said anode means is formed of 0.0008 inch diameter gold plated tungsten wire.

4. The apparatus of claim 3 where each wire in said first and said second plurality of parallel wires of said two-dimensional cathode means is formed of 0.003 inch diameter gold plated copper clad aluminum wire.

5. The apparatus of claim 1 wherein means for sampling includes:
- monitoring means for displaying said two-dimensional intensity distribution of said radiation;
- amplifying means for providing appropriate signal levels to said monitoring means;
- a plurality of analog switches each having an input and an output;
- sequencing and analog switch driving means for sequentially connecting the output of each analog switch in said plurality thereof through said amplifying means to said monitoring means and in synchronism with said monitoring means; and
- a plurality of integration and switch protection circuits each having an input and an output, each output thereof connected to said input of an individually associated analog switch in said plurality thereof, and each input connected to an individually associated cathode wire of said first and second plurality thereof.

6. The apparatus of claim 5 wherein each switch protection circuit in said plurality thereof includes:
- a series connected current limiting resistor to protect against high currents;
- a parallel connected zener diode to protect against high voltages; and
- time constant means to discharge accumulated charge from said cathode means during each sequencing interval of said sequencing means.

* * * * *